INVENTORS
Robert H. Eisengrein &
Francis O. Blackwell, III
BY
Christel + Bean
ATTORNEYS.

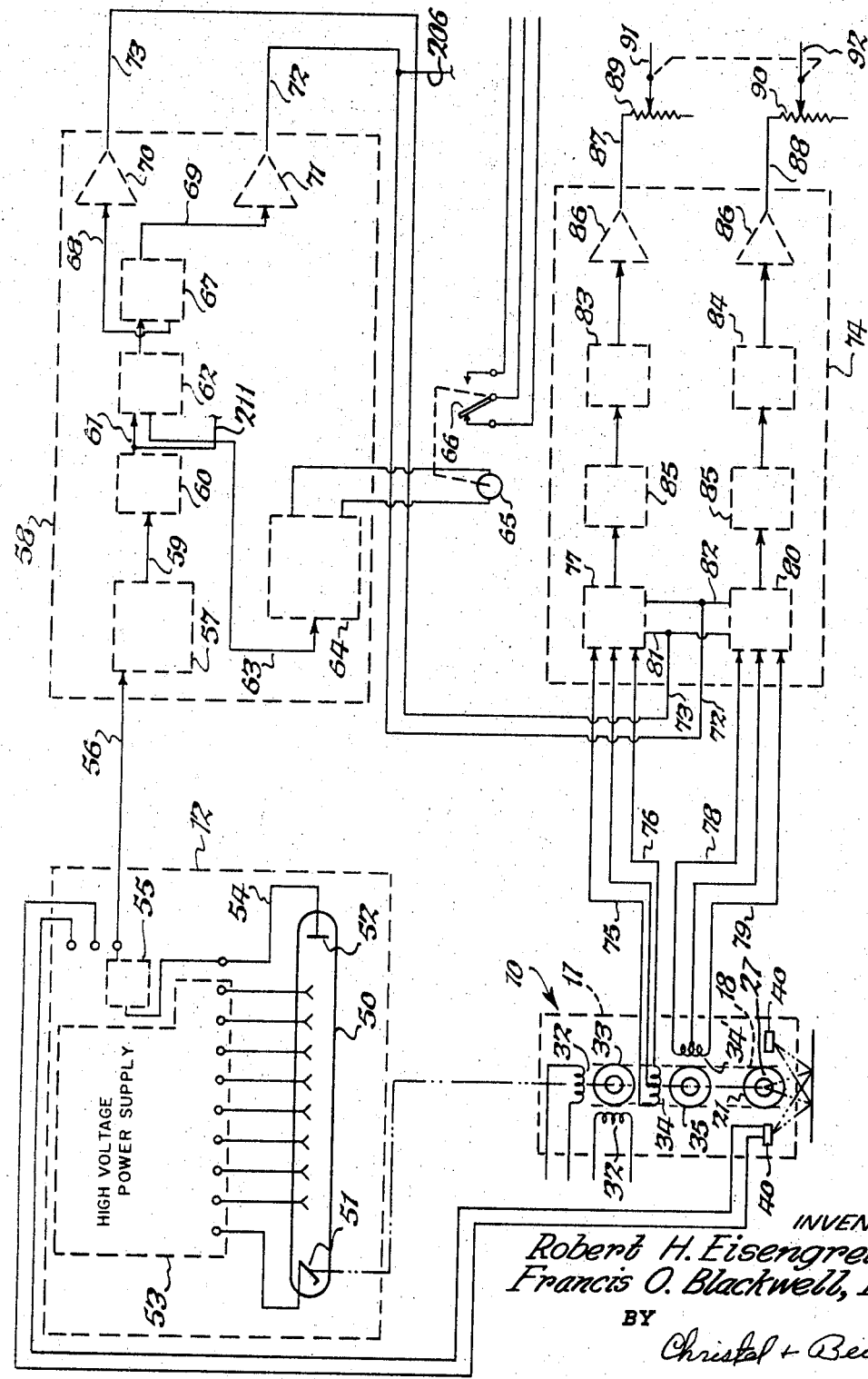

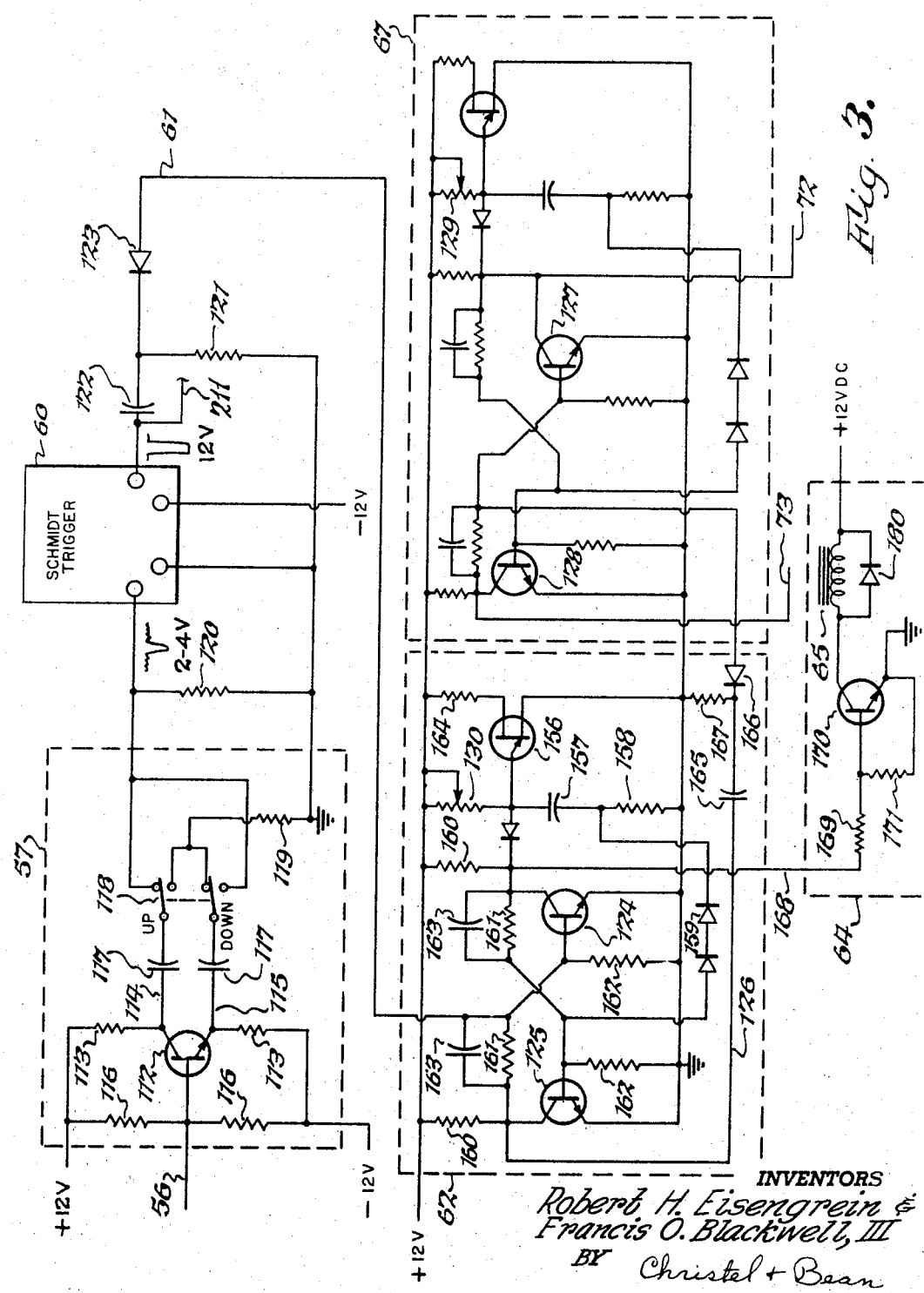

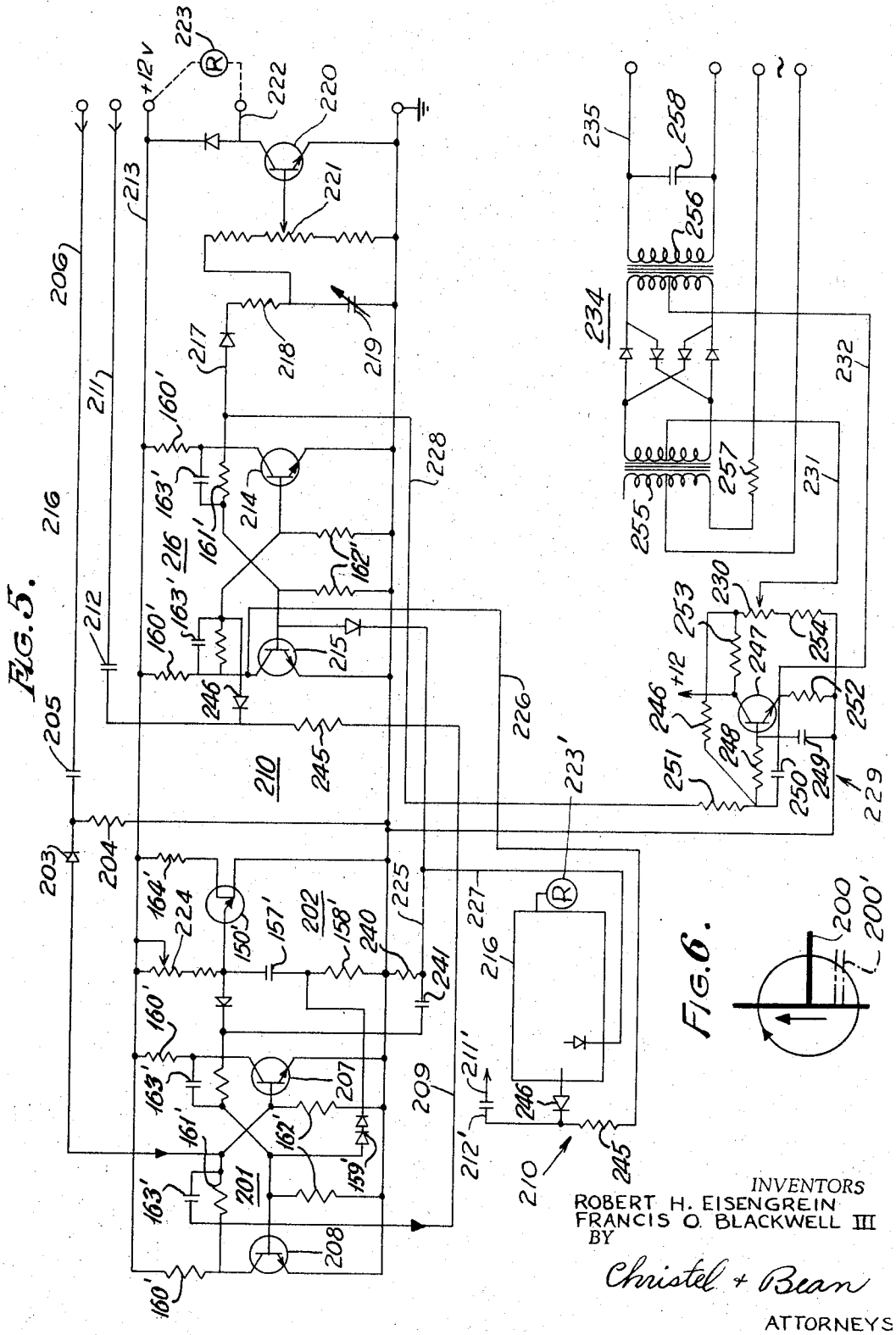

United States Patent Office 3,437,813
Patented Apr. 8, 1969

3,437,813
PATTERN TRACING APPARATUS EMPLOYING CROSSLINE DETECTION CIRCUITS TO CONTROL AUXILIARY FUNCTIONS
Robert H. Eisengrein, Skaneateles, and Francis O. Blackwell III, Seneca Falls, N.Y., assignors to SFM Corporation, a corporation of New Jersey
Filed Mar. 3, 1967, Ser. No. 620,493
Int. Cl. G05b 13/02
U.S. Cl. 250—202    12 Claims

ABSTRACT OF THE DISCLOSURE

A rotary optical scanner causes successive leading and trailing pulses to be generated upon scanning a path line being traced. A drive signal is generated and controlled by the leading pulses, the trailing pulses being rejected. Code pulses are generated upon scanning a code line extending on one side of the path line. A code signal is produced in response to a code pulse generated during the first 180° of scanning following a leading pulse, and is used to control an auxiliary function or the machine drive. The system can respond to more than one code line during each such 180° of scan.

Summary of the invention

This invention relates generally to the control art, and more specifically to a new and useful photoelectric tracer control system for machines.

While the system of our invention is disclosed herein as applied to a vertical mill, it will be appreciated that the tracing system of our invention is equally applicable to other machine tolls, and to machines generally including, without limitation, routing, sewing, flame cutting and welding machinery.

A primary object of our invention is to provide a photoelectric tracing system for the control of machines, which will trace a simple line, as well as an edge, with a high degree of accuracy and which will respond to a code line extending at an angle thereto.

Another object of our invention is to provide the foregoing in a system capable of high speeds of operation.

The foregoing and other objects, advantages and characterizing features of the photoelectric tracing system of our invention will become clearly apparent from the ensuing detailed description of an illustrative embodiment thereof, taken together with the accompanying drawings depicting the same wherein like reference numerals denote like parts throughout.

Brief description of the drawing

FIG. 2 is a generally diagrammatic layout of a photoelectric tracing control system of the invention;

FIG. 3 is a view showing the tracing control, pulse shaping, gating control and on-line circuits;

FIG. 5 is a view showing the code line circuit; and

FIG. 6 is a schematic representation of code line scanning.

The preferred embodiment

Figure 1:
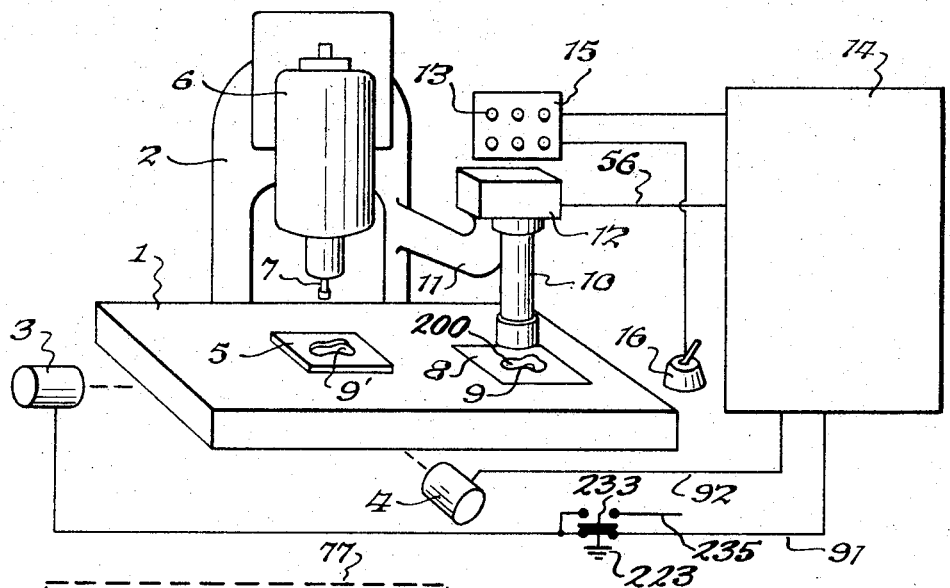
FIG. 1 is a schematic view of a photoelectric tracing system of our invention applied to a vertical mill.

Referring now in detail to the illustrative embodiment depicted in the accompanying drawings there is shown in FIG. 1 a work table 1 mounted on a supporting frame 2 for movement in a horizontal plane along quadrature axes, the table being driven by X and Y axis servo drive motors 3 and 4, respectively. Servo drives 3 and 4 move work table 1 in a manner known in the art, and can be either A.C. or D.C. motors of any suitable type. Preferably, they are of the mechanical amplifier type, such as shown in U.S. Patent 3,187,599 granted June 8, 1965.

A workpiece 5 is mounted on table 1 in a position to be worked upon by, for example, a vertical milling fixture 6 having a cutting tool 7 arranged to cut a pattern into the workpiece. In this instance the pattern to be cut in the workpiece is depicted in a line drawing 8, the pattern comprising a line 9 on drawing 8. This pattern, which could be depicted in an edge drawing as well as a line drawing, is duplicated in workpiece 5 as indicated at 9'.

In the instant case work table 1 and workpiece 5 move relative to cutting tool 7, although it will be appreciated that the reverse could as well be true. Line drawing 8 moves with table 1 relative to an optical tracing head of our invention, generally designated 10. Head 10 comprises part of the tracing system, and can be mounted on machine frame 2 as by a connecting arm 11. Head 10 actuates a photocell assembly, generally desginated 12, in accordance with the pattern 9 being traced. The output of the photocell assembly is transmitted via lead 56 to control circuitry generally denoted 14, the output of which controls servo drives 3 and 4. An operator's control station 15 is provided, together with a joy stick arrangement 16 for manual control of the table movement.

Optical tracing head

Referring now to FIG. 2, optical tracing head 10 comprises a tubular casing 17 of generally cylindrical form. A rotating optical tube 18 is journaled in casing 17 for rotation about the axis of the casing 17. This axis is perpendicular to work table 1 and line drawing 8. At its lower end, tube 18 mounts a scanning head comprising an end cap 21 having an aperture 27 offset from the axis of rotation of tube 18, being eccentric relative thereto and thereby generating a viewing circle about the tube axis.

At its opposite end, tube 18 contains an aperture alined with the axis of rotation of tube 18.

A drive motor is mounted in head 10, having a stator containing windings 32 fitted against the wall of casing 17 and a rotor 33 secured to tube 18 for rotating the same. A generator also is mounted in casing 17, having its stator containing windings 34 secured against an inwardly stepped portion of the casing wall and a rotor 35, preferably permanently magnetized, mounted on tube 18 for rotation thereby. Thus, drive motor 32, 33 rotates tube 18, simultaneously drives generator 34, 35 in unison therewith.

An illuminating assembly is mounted on the lower end of head 10, comprising light sources 40 directed centrally downwardly to illuminate line drawing 8. While a plurality of circularly arranged individual light sources 40 are shown in the drawing, other lighting arrangements can be used, it being understood that the illumiation sources are focused on that portion of line drawing 8 being scanned by the rotating tube 18.

Also, in lieu of light sources carried by head 10, to provide a reflected illumination of line drawing 8, the line drawing could be illuminated from below by means not shown providing a through illumination thereof.

General circuit description

Referring now to FIG. 2, photocell assembly 12 includes any conventional light sensitive electronic device herein identified as a photocell, a photo multiplier tube 50 being shown by way of illustration. Tube 50 is so arranged relative to optical head 10 that light pulses passing therethrough strike the cathode 51 of the tube, generating an output pulse from the anode 52. A suitable high voltage power supply 53 is provided for the tube 50.

The output from anode 52 passes via lead 54 to an emitter follower generally designated 55 which isolates the photo tube from the remainder of the control circuit and provides the desired loading of the tube.

The output from emitter follower 55 is transmitted via lead 56 to a tracing switch control 57 comprising part of a control assembly generally designated 58. From the tracing switch control 57 the signal is transmitted via lead 59 to a Schmitt trigger 60 where it is shaped to provide a pulse having a sharp rise, for purposes to be described.

The output from Schmitt trigger 60 passes via lead 61 to the first flip flop stage 62 of the multi-vibrator circuit the function of flip flop 62 being to reject traiilng edge pulses, as will be described hereafter. The first flip flop 62 also provides an actuating signal via lead 63 to an on-line circuit 64 which controls a relay 65. A switch 66 is operated by relay 65 and can be connected to perform a number of functions such as: turning on a light 13 (FIG. 1) to visually indicate when tracing head 10 is on the line being traced; shutting down the drive system when the tracing head is no longer on the line to be traced; and other functions. A second flip flop stage 67 provides a second pulse spaced approximately 180° from the leading edge pulse which triggered the first flip flop stage 62.

The output pulses from the second flip flop stage 67 are transmitted in step form via leads 68 and 69 to amplifiers 70, 71 of conventional design. The amplified signals are transmitted via leads 72, 73 to a gating and modulator control assembly 74 where they are used to gate the output signals from the quadrature spaced windings 34, 34' of the tracing head generator, for control of the servo drives 3, 4.

The output signal from one quadrature winding 34 is transmitted via leads 75, 76 to a diode switch 77 for that axis. The output from the other quadrature winding 34' is transmitted via leads 78 and 79 to a diode switch 80 for the other axis. Diode switches 77, 80 are gated by the multi-vibrator output through leads 72, 73, 81 and 82. The output signals from the respective diode switches are transmitted to modulators 83, 84 via low pass filters 85, providing D.C. signals proportional to the desired speeds and of a polarity corresponding to the desired direction of movement along the respective axes. The modulated signals are amplified at 86 and transmitted via leads 87 and 88, and ganged potentiometers 89, 90 for feed rate control, to leads 91 and 92 to the respective X and Y axes servo motor drives 3, 4.

Where the servo motors are D.C. motors the modulators 83, 84 can be omitted and the D.C. signals from diode switches 77 and 80 passed directly through filters 85 and amplifiers 86 to the respective drives.

Optical tracing head 10, photocell power supply 53 and emitter follower 55 can be like the correspondingly numbered parts shown in FIGS. 2 and 3 of pending application Ser. No. 499,234 filed Apr. 19, 1965, in the name of Francis O. Blackwell III, one of the inventors herein. Since any suitable head, power supply and follower can be used herein, and the details thereof are no part of this invention, no further description is necessary.

Emitter follower 55 performs an isolating function, in effect insulating the photocell assembly from the balance of the system while serving to transmit the photocell output to the necessary control components. It provides a high input impedance and a low output impedance, giving a substantial power amplification of the input signal without however, producing any variation in pulse height.

The output from emitter follower 55 is transmitted via lead 56 to a complementary output transistor arrangement comprising part of the racing switch circuit 57 (FIG. 3). This arrangement includes a transistor 112 having its base connected to output lead 56 from emitter follower 55. Both the collector and the emitter of transistor 112 are provided with loading resistances 113 and comprise complementary output circuits including the leads 114, 115. The output signals transmitted via leads 114, 115 are complementary and equal, but opposite in polarity. Biasing resistances 116 determine the operating level of the transistor 112. One or the other of the output pulses is transmitted via coupling condensors 117 and switch 118 to the input of Schmitt trigger 60.

The complementary pulses of opposite polarity and switch 118 are provided for the purpose of providing the Schmitt trigger 60 with a negative pulse input, this being the only pulse which the Schmitt trigger will accept, regardless of whether the optical sensing head is tracing a light line on a dark background or a dark line on a light background. A grounding resistance 119 is provided to ensure balanced loading of the transistor 112.

Schmidt trigger 60 is of conventional form, its function being to shape the ragged and relatively weak input pulse and produce an output pulse having a sharply defined steep rise, as clearly indicated on the drawing. Since Schmidt trigger circuits are well known, the details thereof have been omitted. A loading resistance 120 is provided, as is a grounding resistance 121.

The output from the Schmidt trigger 60 passes via coupling condensor 122, blocking diode 123 and lead 61 to the first flip flop stage 62, turning off transistor 124 and turning on transistor 125. Turning on transistor 125 produces a negative voltage swing via lead 126 which turns off transistor 127 and turns on transistor 128 in the second flip flop stage 67. Turning on or setting the second flip flop stage 67 as thus described initiates the reset function, the timing of which can be adjusted by a variable potentiometer 129. In like manner, the above described setting of the first flip-flop stage 62 initiates its reset function the timing of which can be adjusted by variable potentiometer 130. Prior to resetting of first flip flop stage 62 it will be insensitive to succeeding pulses transmitted to it via lead 61, and potentiometer 130 is adjusted to cause the first flip flop stage 62 to reset subsequent to the trailing edge pulse and prior to the succeeding leading edge pulse, the terms leading and trailing having reference to the direction of relative movement of head 10 along line 9 (FIG. 1). For example, potentiometer 130 can be set to cause resetting of stage 62 approximately 300° after intersecting the leading edge of line 9. Potentiometer 129 is adjusted to cause resetting of stage 67 in the area of 180° after intersecting the leading edge of line 9. Theoretically it would reset at 180° from the point of intersection with the leading edge of the line. However, where it is desired to actually trace the line, as distinguished from the leading edge of the line, some adjustment from 180° normally is required.

Figure 4:
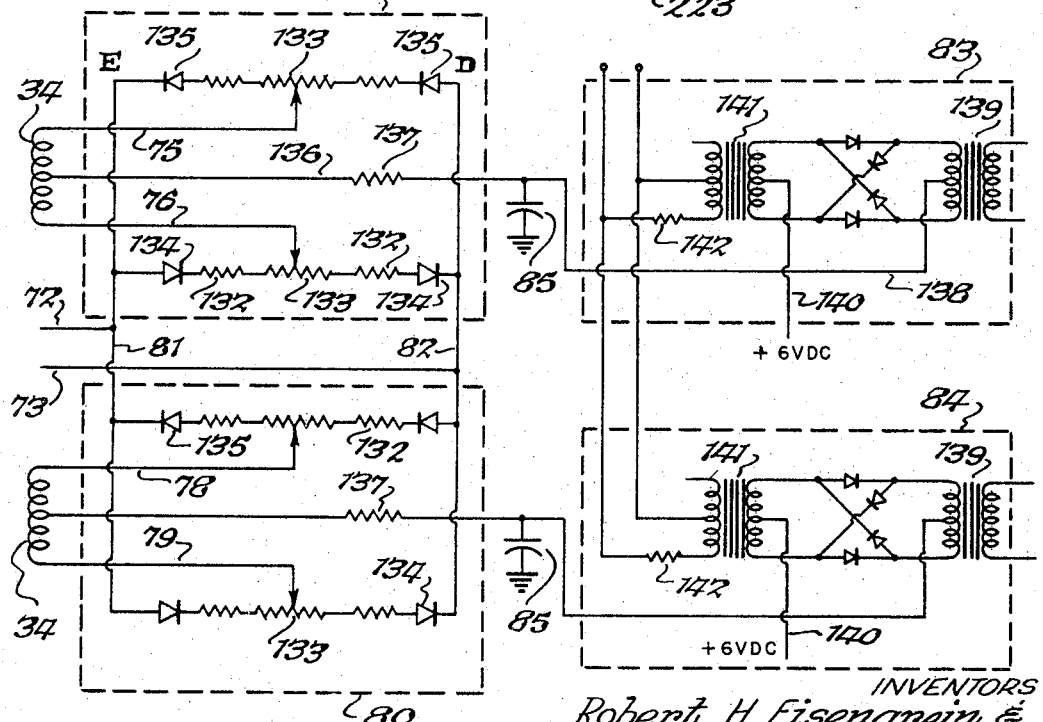
FIG. 4 is a view of the gating and modulator circuits.

As previously described, the output signals from flip flop stage 67 are transmitted via amplifiers 70, 71 and leads 72, 73 to the diode gate circuits. Diode gates 77 and 80 are identical, as are modulators 83, and 84. Therefore, only one of each will be discussed in detail. Referring now to FIG. 4, diode gate 77 includes a pair of A.C. grounding networks arranged in opposition and each including in the illustrated embodiment a pair of resistances 132 and an adjustable potentiometer 133 in series with blocking diodes 134 and 135. Diodes 135 are arranged in opposition to diodes 134 whereby for a given voltage drop between leads 81 and 82 only one of the grounding networks will be conducting. Generator stator winding 34 has its opposite ends connected to the two grounding networks, whereby only one side of the winding 34 is grounded at any one time.

In like manner, generator stator winding 34' is grounded through gate 80.

The voltage drop between lines 81 and 82 is reversed in polarity by the resetting of the second stage flip flop 67 whereby it is of one polarity when flip flop 67 is first set by the triggering pulse and of the opposite polarity when flip flop 67 resets itself approximately 180° later.

Grounding of generator field 34 through one of the grounding networks permits the output signal from that winding to pass via lead 136, resistance 137 and filtering condensor 85, while the subsequent grounding of field coil 34 through the other grounding network causes the inverse of the generated signal to be transmitted via lead 136. These signals average out in the filtering network 85, producing a resulting D.C. average voltage signal which is transmitted via lead 138 to the center tap of the primary winding of a transformer 139. A base voltage signal of the same magnitude as the voltage tapped from potentiometers 133, in this instance 6 volts, is transmitted from a suitable source via lead 140 to the center tap of the secondary winding of a transformer 141. The voltage difference between these signals (i.e. leads 138 and 140) is proportional to the rate of feed along the X axis (in the case of gate 77; the Y axis in the case of gate 80) required to follow line 9, and the polarity thereof indicates the necessary direction of travel.

Transformer 141 is energized from a suitable A.C. source, not shown, via a current limiting resistor 142, the output of transformer 139 thereby providing a modulated A.C. drive signal corresponding to the indicated rate of feed and direction of movement along the particular axis. This signal is amplified at 86 (FIG. 2) and transmitted to the servo drive for that axis as previously described. Where D.C. servo drives are utilized, modulators 83 and 84 can be omitted.

The flip flop stages 62 and 67 are identical, except for the relative adjustment of the reset function. Each can comprise a conventional one-shot multivibrator including a unijunction transistor 156. When the transistor 124 is turned off, condensor 157 charges through potentiometer 130. When transistor 156 fires, it generates a pulse across resistor 158, this pulse being coupled through diodes 159 to the base of transistor 125, turning it off and resetting the circuit to its initial condition. Load resistances 160, bias resistances 151 and grounding resistances 162, together with filtering condensors 163 are provided, along with a temperature compensating resistance 164, the function and operation thereof being well known to those skilled in the art, further comment is not required.

The flip flop stages are connected via lead 126, coupling condensor 165 and a blocking diode 166, a grounding resistance 167 also being provided. The first flip flop stage 62 is connected to the on-line circuit 64 via lead 168, coupling resistance 169 and a transistor 170, the level of operation of which is determined by a bias resistance 171. Relay 65 is controlled by operation of transistor 170. The characteristics of relay 65, and its control circuit including blocking diode 180 causes relay 65 to remain energized during the time the first flip flop stage 62 is off. Stage 62 is off when it has been reset, which is adjusted to occur after the lagging pulse whereby the latter is rejected.

*Code line response*

It is a particular feature of our invention that the system also is responsive to code lines, such as indicated at 200 (FIG. 6), which are positioned at one or more points along the path line 9 being traced. In the illustrated form, code lines 200 extend at a perpendicular to path line 9 from the unused, trailing edge side thereof, this being the right-hand side as viewed in FIG. 6. Also, code line 200 extends outwardly from path line 9 a distance at least equal to the eccentricity of tracing head 10.

Referring now to FIG. 5, there is provided a code line flip-flop stage 201 having an outboard timer stage 202. Stage 201 is coupled via blocking diode 203, a differential network including resistance 204 and condenser 205, and lead 206 to the output from multi-vibrator 67, lead 206 being connected to the amplified signal output lead which transmits negative pulses, in this case lead 72. Differential network 204, 205 gives a peaked pulse, corresponding to the leading edge pulse, which turns off transistor 207 and turns on transistor 208. Turning on transistor 208 produces a negative voltage swing via lead 209, conditioning and gate 210 to receive a code line pulse.

Multi-vibrator circuit 62, as previously noted, is timed to ignore or reject the trailing edge pulse produced when eccentric lens 21 rotates across path line 9 180° after the leading edge pulse. This means that the pulse which is generated when photo cell 12 scans code line 200 (during the interval between the leading and trailing edge pulses) does not influence multi-vibrator stage 62 which ignores or rejects it. However, this code line pulse is utilized to perform auxiliary functions in the following manner.

The output pulses from Schmitt trigger 60 are transmitted via lead 211 (FIG. 5) to and gate 210 comprising resistance 245 and blocking diode 246. These are negative pulses which are differentiated by condenser 212 to peak them, because it is the leading edge of the pulse which is utilized. When lead 209 is positive, at about the potential of line 213 (12 v. for example), the negative pulses transmitted via lead 211 are blocked at and gate 210. However, when transistor 208 has been turned on (by a leading edge pulse) lead 209 drops to substantially no voltage, whereupon and gate 210 is driven to a negative voltage by a succeeding code line pulse from Schmitt trigger 60. When this occurs, the Schmitt trigger code line pulse is passed by gate 210 and turns off transistor 214, causing transistor 215 to turn on. This sets the and gate flip-flop stage 216, producing an output pulse which is transmitted via lead 217 to a filtering network comprising resistance 218 and condenser 219, which latter can be variable to provide an adjustable timing function. Filtering network 218, 219 produces an average D.C. voltage which is proportional to the width of the code line pulses, and these are amplified by an adjustable gain amplifier, including transistor 220 and potentiometer 221, the output of which is transmitted via lead 222 to a relay 223 which can be used to actuate a signal or to perform any desired auxiliary function.

Outboard timer 202 is adjusted by means of a variable potentiometer 224 to produce a reset pulse substantially 180° after the leading edge pulse which sets flip flop stage 201. In addition to resetting the stage 201, the reset pulse is transmitted via lead 225 and a hi-pass RC filter 240, 241 to and gate flip flop 216, resetting it.

Thus, each leading edge pulse sets stage 201, conditioning and gate 210 to receive a code line pulse during the succeeding 180° of scanning. If during this time there is no code line 200 and therefore no code line pulse, nothing happens, and flip flop 216 remains in a reset condition. The transmission of a reset pulse via lead 225 does not affect it. After 180° of scanning stage 201 is reset, automatically, by timer 202. This restores the blocking condition of and gate 210, to reject any pulses which might happen to be received during the second 180° of scanning which occurs on the leading edge side of path line 9 (the left side in FIG. 9).

If, however, during the 180° of scanning on the trailing edge side of path line 9 there is a code line 200, a code pulse will be produced and pass by gate 210, producing an output signal causing actuation of the auxiliary function relay 223.

Sometimes it might be desirable to provide an auxiliary function response to multiple code lines, spaced closely enough to be scanned during a single scanning movement. This can be done by providing a second and gate 210' and a flip-flop stage 216' associated therewith, the polarity of gate 210' being controlled by the condition of the first and gate flip-flop stage 216 via lead 226. The output of Schmitt trigger 60 is transmitted to and gate 210' via lead 211' and differentiating condenser 212'. Normally, with stage 216 in its reset condition, and gate 210' is positive at about the potential of line 213 and negative pulses passing thereto via lead 211' are blocked. However, if a code line pulse has passed via lead 211 and gate 210 and has set flip-flop 216, this drives gate 210' substantially to zero, whereupon a subsequent, negative, code line pulse transmitted thereto via lead 211' will pass gate 210' and will cause flip-flop 216' to be set. Flip-flop 216' is identical with flip-flop 216, and includes a filtering and amplifier network 218–221 identical with that described above in connection with flip-flop 216, whereby the setting of flip-flop 216' will cause actuation of a second auxiliary function relay 223 in response to a scanning of a second code line 200'. Relay 223', like relay 223, can be used to control the performance of any desired function. The reset pulse produced by timer 202 of stage 201 is transmitted via leads 225 and 227 to reset flip-flop 216' restoring the system to receive another leading edge pulse. While only two code line response networks are disclosed herein additional networks can be provided, in the disclosed arrangement for response to three or more code lines in a single scan.

Sometimes it is desired to stop a machine at a position corresponding to the intersection of code line 200 with path line 9. That is accomplished as follows. The output pulse from flip flop 216 also is transmitted via lead 228 to an active, low pass filter 229 the output of which varies in proportion to the position of code line 200 in the scanning arc. In other words, the output of filter 229 is at a maximum when code line 200 is intersected immediately after intersection of the leading edge of path line 9, and at a minimum when code line 200 is intersected just prior to intersection of path line 9 on the trailing edge thereof. A voltage divider 230 is set at the voltage corresponding to that produced by filter 229 when code line 200 is exactly half-way or 90° from the intersection of scanner 10 with a path line 9. The voltage differential between filter 229 and divider 230 is proportional to the distance of the tracing head axis (about which it scans) from code line 200, and has a polarity indicating the direction along path line 9 which the tracing head axis is offset from code line 200.

The outputs from divider 230 and filter 229 are transmitted via leads 231 and 232, respectively, to modulator 234 which converts the aforesaid voltage differential to an A.C. control signal transmitted via lead 235.

In the simplified version illustrated, path line 9 is assumed to lie on one of the quadrature axes of the machine. In actual practice, this is not a disadvantageous arrangement. Assume, for example, that line 9 is alined with the X axis in the area of code line 200. When relay 223 is actuated in response to scanning of pulse line 200 it shifts a switch 233 (FIG. 1), interrupting the feed signal circuit to servo 3 from amplifier 86 via lead 91 and completing a feed signal circuit from modulator 234 via lead 235. This rate of feed signal diminishes until the tracer head axis coincides with the intersection of code line 200 and path line 9, whereupon the machine stops.

The code line signal is strongest when code line 200 is intersected at a point close to path line 9 and diminishes with forward movement of the scanner relative to code line 200. The gain of amplifier 220 and 221 can be adjusted to actuate relay 233 (and 233') only in response to code lines 200, 200' positioned within a predetermined angle of scanning, measured from the point of intersection of the path line leading edge.

Flip flop stages 201 and 216 are like stages 62 and 67, except for the relative adjustment of the reset function and for such variations in the values of the various circuit componnts as will be readily understood by those skilled in the art. Therefore, and to avoid needless repetition, corresponding elements have been given the same reference numerals, with primes to distinguish them from the circuit elements in FIG. 3, it being understood that the function of such elements remains the same as previously described.

Filter 229 incudes a resistance 246 biasing transistor 247, an RC filter network 248, 249. A condenser 250, in conjunction with resistance 251 provides another low pass RC network. An emitter resistance 252 also is provided.

Voltage divider 230 also includes resistances 253 and 254.

Modulator 234 is like modulators 83 and 84, comprising a pair of transformers 255 and 256. Transformer 255 is excited from a suitable source via current limiting resistance 257. A tuning condenser 258 can be placed across transformer 256.

It will be appreciated that control panel 15 will contain such start and stop, manual and automatic and other controls as may be desired, and that joy stick 16 will be connected into the circuit for manual actuation of the work table 1, all in a manner well understood by those skilled in the art. Therefore, and inasmuch as the details of such arrangements are not per se a part of our invention, they are not included here.

While we have disclosed and described in detail only one embodiment of our invention, that has been by way of illustration, without thought of limitation.

What we claim as new is:

1. A tracing type machine control system comprising rotary scanning means, detector means for generating path line pulses in response to scanning of a path line being traced, said detector means also generating code pulses in response to scanning of a code line by said scanning means on one side of a path line being traced, means responsive to said path line pulses for producing a machine drive signal, code signal generating means responsive to said code pulses, timing means triggered by said path line pulses, and gating means controlled by said timing means and arranged in controlling relation to said code signal generating means.

2. The system of claim 1, wherein said path line pulses comprise leading pulses, and wherein said timing means includes means automatically resetting said gating means to block pulses during the substantially second 180° of scanning after each leading pulse.

3. The system of claim 1, together with another code signal generating means responsive to a second code pulse during a single scan, and additional gating means controlled by the first and said gating means and arranged in controlling relation to said other code signal generating means.

4. The system of claim 1 wherein said path line pulses comprise leading pulses, and wherein said timing means include multivibrator means triggered by said leading pulses to condition said gating means for passage of said code pulses, and reset means operable to restore said gating means to block pulses received after about 180° of scanning from a leading pulse.

5. The system of claim 4, wherein said code signal generating means includes multivibrator means triggered by said code pulses.

6. The system of claim 5, wherein said reset means are operable to reset said timing and code signal multivibrator means.

7. The system of claim 1, wherein said code signal generating means includes means producing an average output voltage proportional to the width of said code pulses.

8. The system of claim 1 wherein said code signal generating means includes means producing a signal proportional to the distance of the center of scanning from the intersection of the code and path lines being scanned.

9. The system of claim 1, together with drive means normally responsive to said drive signal, and means operable in response to said code signal generating means to switch control of said drive means from said drive signal to said code signal.

10. The system of claim 1 wherein said path line pulses comprise successive leading and trailing pulses, and wherein said drive signal producing means comprise timing means triggered by said leading pulses and operable to reject said code and trailing pulses, signal generating means synchronized with said scanning means, and gating means controlled by said drive signal timing means and arranged in controlling relation to said last-named signal generating means.

11. The system of claim 10, wherein said drive signal timing means comprises first multivibrator means triggered by said leading pulses and including reset means timed to reject said trailing pulses, and second multivibrator means triggered by said first multivibrator means, said gating means being controlled by said second multivibrator means, said code signal timing means comprising third multivibrator means triggered by said second multivibrator means to condition said code signal gating means for passage of said code pulses, and reset means operable to restore said code signal gating means to blocking condition.

12. A system according to claim 1, wherein said scanning means comprise an optical scanner and said detector means comprise a photocell.

References Cited
UNITED STATES PATENTS

| | | | |
|---|---|---|---|
| 2,999,938 | 9/1961 | Hann et al. | 250—202 |
| 3,369,123 | 2/1968 | Bardwell et al. | 250—202 |

JAMES W. LAWRENCE, *Primary Examiner.*

E. R. LA ROCHE, *Assistant Examiner.*

U.S. Cl. X.R.

250—219